United States Patent [19]

Messick

[11] Patent Number: 5,246,201

[45] Date of Patent: Sep. 21, 1993

[54] ORIFICE ASSEMBLY FOR GAS METERING DEVICE

[75] Inventor: Walker A. Messick, Indianapolis, Ind.

[73] Assignee: Regin Manufacturing, Inc., Indianapolis, Ind.

[21] Appl. No.: 912,898

[22] Filed: Jul. 13, 1992

[51] Int. Cl.$^5$ .............................................. F16K 5/10
[52] U.S. Cl. .................... 251/208; 251/205; 251/216
[58] Field of Search ............. 251/215, 216, 205, 208, 251/121, 296; 137/613

[56] References Cited

U.S. PATENT DOCUMENTS

| | | | |
|---|---|---|---|
| 3,067,768 | 12/1962 | Burg | 251/205 |
| 3,450,156 | 6/1969 | Miller, Jr. | 251/205 |
| 3,683,957 | 8/1972 | Sands | 251/208 |
| 3,949,966 | 4/1976 | Fabish | 251/206 |
| 4,020,863 | 5/1977 | Fabish | 137/116.5 |
| 4,140,297 | 2/1979 | Bussell | 251/208 |
| 4,148,460 | 4/1979 | Kinsler | 251/206 |
| 4,173,986 | 11/1979 | Martin | 137/505.25 |
| 4,241,896 | 12/1980 | Voege | 251/206 |
| 4,366,947 | 1/1983 | Voege | 251/206 |
| 4,643,215 | 2/1987 | Phlipot et al. | 251/207 |
| 4,655,246 | 4/1987 | Phlipot et al. | 251/206 |
| 4,909,476 | 3/1990 | Messick | 251/206 |

*Primary Examiner*—A. Michael Chambers
*Attorney, Agent, or Firm*—Locke Reynolds

[57] ABSTRACT

An orifice assembly for use in sealed fluid connection between a gas inlet and gas outlet in a gas flow meter includes a rotor positioned for rotatable movement in fluid connection with both the gas inlet and gas outlet. The rotor includes a plurality of bores in a first circular plate and a matching number of gas passageways in a second circular plate, the passageways being aligned with the bores. The rotor also includes an annular groove separating the first and second circular plates and in fluid communication with the gas inlet for introducing gas into the gas passageways. A plug is adjustably positioned in each bore and axially movable toward the corresponding gas passageway to partially block gas flow from the inlet toward the outlet.

16 Claims, 2 Drawing Sheets

ORIFICE ASSEMBLY FOR GAS METERING DEVICE

BACKGROUND OF THE INVENTION

This invention relates generally to the field of gas flow-meter devices and more specifically to an orifice assembly for a gas-metering device.

The invention is especially applicable to precisely calibrated gas-metering orifices for metering a flow of gas, such as therapeutic oxygen, at a prescribed rate to a patient. The invention also relates to a flow meter which uses such metering orifices to selectively provide a plurality of accurate gas flow rates and to a pressure regulator unit having all of its component parts retained therein.

In the past, orifice punch devices have been used to make orifices of various sizes for flow meters. Generally with these punch devices, the operator punches an orifice in an element and then moves the element from the punch device to a separate flow testing device for measurement of the flow therethrough. If a greater rate of flow is required, the element is transferred back to the punch device for further punching. The transfer of the element back and forth for further punching and testing is continued until the orifice is properly sized. Such a procedure is an inefficient use of the operator's time. In the alternative batch process, the operator punches a series of elements to form similar size orifices in each element. Although more time efficient, batch processing often requires greater uniformity of elements than is economically feasible during the manufacturing process.

Another method of providing a volumetric metering or gas flow is described in Messick, U.S. Pat. No. 4,909,476, issued Mar. 20, 1990, the disclosure of which is herein incorporated by reference. Messick describes an orifice assembly that includes a plurality of brass disks. The disks are held in position by an O-ring disposed between the disks and a retaining plate fixed to a rotor. Orifices of a predetermined size are formed in each brass disk to allow passage of pressurized gas at a fixed rate through the brass disks. A piercing fixture accommodating a needle is used to pierce the brass disks. Since the needle is tapered, advancement of the needle through some defined distance creates an orifice of a desired size.

However, provision of brass disks and the method of orifice formation described by Messick has certain practical limitations under industrial conditions. Proper positioning of large numbers of the small brass disks is difficult and time consuming. In addition, over-advancement of the needle of the piercing fixture can result in an improperly sized orifice that must be removed and replaced, a time consuming process.

SUMMARY OF THE INVENTION

To overcome the disadvantages of the brass disk orifice assembly, the present invention provides an improved orifice assembly for metering the flow of a presurized gas. The improved orifice assembly is positioned in sealed fluid connection between a gas inlet and gas outlet respectively defined in the gas flow meter. In a preferred embodiment, the orifice assembly includes a rotor positioned for rotatable movement in fluid connection with both the gas inlet and gas outlet. The rotor defines a plurality of bores therethrough and a matching number of gas passageways therethrough, with each pair of bores and gas passageways being positioned along a common axis.

The rotor also includes a mechanism for introducing gas from the gas inlet into the gas passageways and a mechanism for plugging the gas passageways. The plugging mechanism is positioned to extend through the gas passageways to partially block gas flow into the gas passageways.

In a preferred embodiment, the rotor is integrally constructed from a flat metal disk to have a first circular plate situated parallel to a second circular plate, with the first circular plate connected to the second circular plate by an axially situated, integrally formed connecting post. The first circular plate defines a plurality of bores therethrough, and the second circular plate defines a matching number of gas passageways therethrough. An annular groove is defined between the first and second circular plates to intersect the axes of the bores and their corresponding gas passageways. The annular groove is positioned in fluid connection with the gas inlet to allow gas from the gas inlet to pass through the annular groove into the gas passageways.

The plugging mechanism can include a plurality of plugs separately positioned to extend through each bore defined in the first circular plate, with each plug having an end axially movable toward the gas passageways to partially block gas flow from the annular groove and gas inlet into the gas passageways. In certain embodiments, each plug is externally threaded to allow axially directed screw movement of each plug within its respective bore to advance or withdraw each plug from the gas passageway positioned opposite the bore. The internal threads of the bores can optionally be differently sized than external thread on the plugs to ensure an interference fit between each plug and each bore inhibiting any unwanted relative movement.

Depending upon the degree of blockage of the gas passageway by its axially situated and opposing plug, the amount of gas flow from the gas inlet, through the annular groove and into the gas passageway can be accurately determined. Since gas can flow through only a single gas passageway at a time, a mechanism is provided for rotating the rotor to successively bring each gas passageway into fluid communication with the gas outlet. For most commercial applications, successive plugs (determined as one moves around the rotor) are manually set from a position of almost complete blockage of gas flow, through a series of incrementally increasing gas flow, to a completely open and unblocked position. For ease of manual selection of gas flow rates, the rotation mechanism includes a shaft engagable by a manually turnable knob. The knob is numerically marked to indicate gas flow rate, and is provided with a detent mechanism to allow an operator to rotate the orifice to a precise selected position. During calibration, the gas flow adjustment through each passageway and plug combination can be achieved without any need to remove the rotor from the calibration fixture.

The various features and advantages of the invention will become more apparent to those skilled in the art upon consideration of the following detailed description of a preferred embodiment exemplifying the best mode of carrying out the invention as presently perceived. The detailed description particularly refers to the accompanying drawings.

DESCRIPTION OF THE PREFERRED EMBODIMENT

Figure 1:
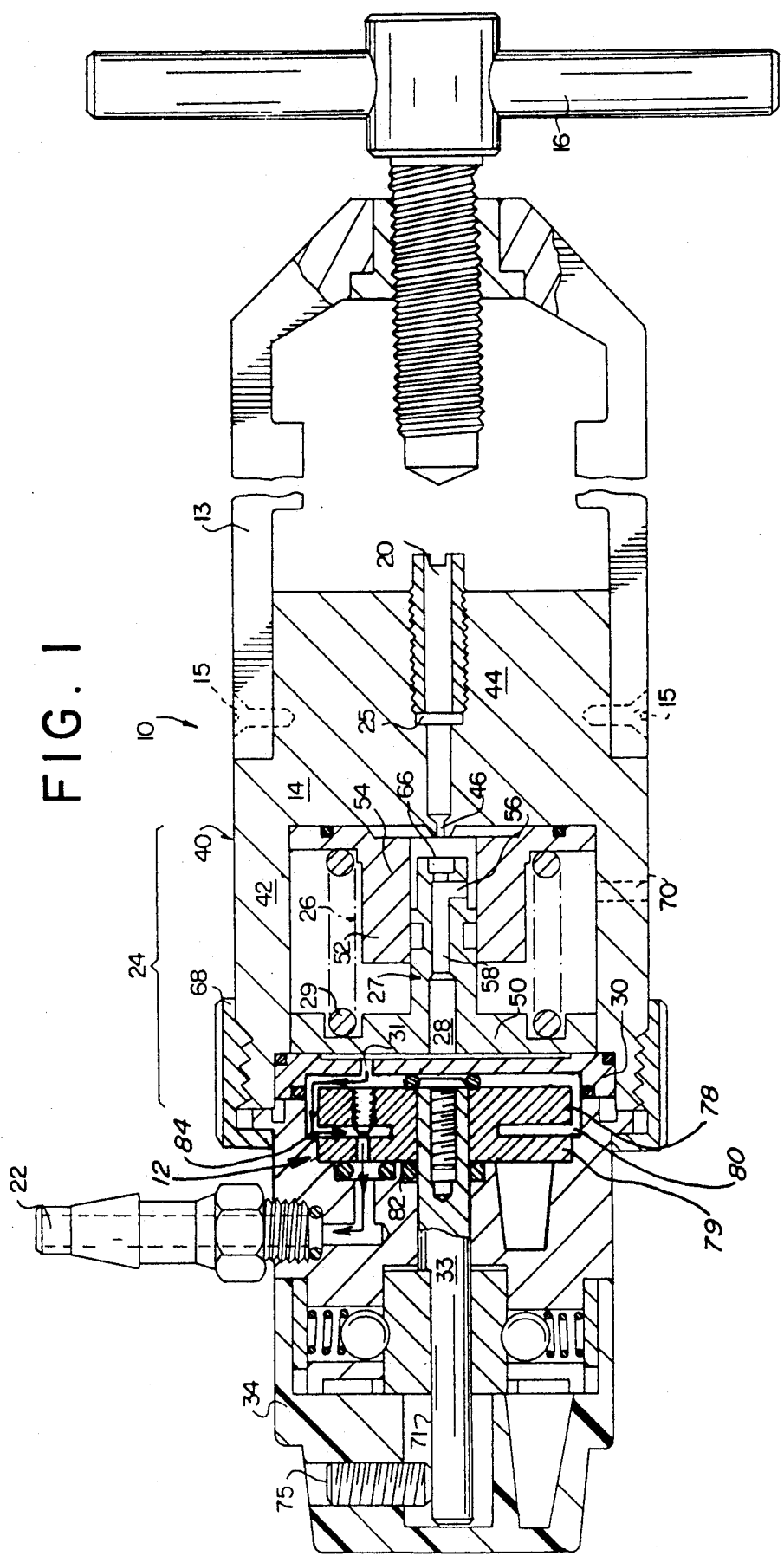
FIG. 1 is a side, cross sectional view of a gas flow meter having a pressure regulating region that includes an orifice assembly for controling gas outflow.

Referring now to FIG. 1, there is illustrated a gas flow meter 10, operable on gas from a pressurized gas source (not shown). The gas flow meter 10 includes an orifice assembly 12. Flow meter 10 includes a yoke 13 secured to body 14 by a screw threaded studs 15. Yoke 13 has a T-handle 16 which permits the attachment and mounting of the gas flow meter to an outlet valve on a pressurized gas cylinder (not shown). In one recent embodiment, a CGA (Compressed Gas Association) 870 style yoke was used for securing the gas flow meter 10 to a cylinder of pressurized oxygen. It is understood, however, that the gas flow meter 10 of the present invention can be practiced with the flow meter having a different style yoke 13 or no yoke at all.

Body 14 includes a gas inlet 20 and a gas outlet 22 separated by a pressure regulating region 24 and the orifice assembly 12. Gas entering through gas inlet 20 passes through a standard replaceable filter disk 25 before entering pressure regulating region 24. The filter disk 25 serves to remove impurities present in the system, whether they enter the system from the pressure cylinder gas, the threading of the cylinder outlet valve, or elsewhere along the gas flow line. The filter disk 25 impedes particles sized as small as 100 microns without unduly restricting flow through the gas flow meter 10, permitting gas flow therethrough at the desired range of rates.

The gas flow meter 10 is designed to maintain an outlet flow pressure of 50 psig nominal for all flow ranges when provided with a gaseous supply in the range of 50 to 200 psig. Region 24 includes a spring biased manifold assembly 26 and piston assembly 27 having an internal flow passage 28. A compressed coil spring 29 and the relationship between the manifold assembly 26 and the piston assembly 27 reduce the pressure of the gas from the higher pressure at the source 20 to a nominal pressure of 50 psi at the interface plate 30. The pressure is maintained at 50 psi until the feed cylinder pressure falls below this level. The gas then passes through an aperture 31 in the interface plate 30 at which point it next comes in contact with the orifice assembly 12.

Figure 2:
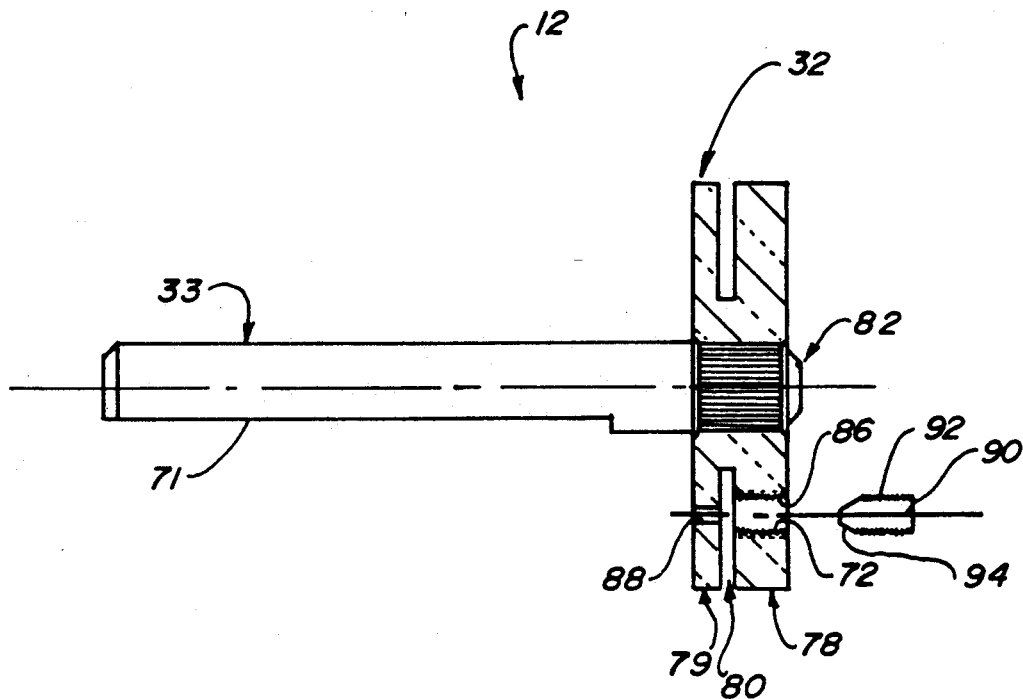
FIG. 2 is a cross sectional schematic view of an orifice assembly including a shaft attached to an integrally formed rotor, and a plug insertible into a bore defined through a portion of the rotor.

The orifice assembly 12 includes a plurality of bores 72 and axially aligned gas passageways 88. The bores 72 and gas passageways 88 are adapted to be selectively positioned or indexed by rotating rotor 32 to preselected positions. As best illustrated in FIG. 2, the rotor 32 is rotatable by means of shaft 33 projecting axially out of body 14. A knob 34 is fixed to shaft 33, the knob includes appropriate markings to indicate the angular position of rotor 32. The markings can be raised Braille type facilitating use of the flow meter by the visually impaired. To further assure proper flow setting, knob 34 can be provided with a standard positive self-centering, audible detent.

Regulator unit 40 is incorporated in the regulating region 24. Regulator unit 40 includes a regulator body 42 which is threadably engaged with the flow meter body 44. Flow meter body 44 has an orifice 46 through which the operational gas passes into regulator unit 40. The gas entering the regulator 40 first comes in contact with the head 48 of a piston 50, which in turn passes through the internal sleeve 52 of pressure manifold 54. The pressure manifold 54 is held captive between the flow meter body 44 and the regulator body 42. zpiston 50 has a side port 56 through which the operational gas passes to the internal passage 58 of piston 50. The operational gas then communicates with the interface plate 30 of regulator body 52 which has gas outlet aperture 31 through which the gas exits the regulator unit and enters the orifice assembly 12.

The travel of piston 50 relative to regulator body 42 and captive pressure manifold 54 is regulated by a coil spring 64 and the pressure of the operational gas passing through the internal piston passage 58.

The head 48 of piston 50 includes a flexible seal 66. When gas flowing out of the regulator unit 40 is shut off, pressure builds within the unit causing the piston head 48 to travel within the manifold sleeve 52. The pressure continues to build until the internal pressure is sufficient to cause the seal 66 to abut against orifice 46 of flow meter body 44, thus shutting off flow into the regulator unit 40. The seal 66 is preferably made of a polymer material. A molybdenum disulfide filled nylon material has been found to be most preferred.

Regulator body 42 has a standard ring nut 68 threaded to it, permitting the mounting of the regulator unit 40 to a flow metering assembly such as the previously described orifice assembly 10.

Regulator body 42 is also provided with a safety vent port 70, which provides an atmospheric pressure release should the gas, for any reason, inadvertently leak into the region encased by regular body 42, piston 50, and manifold 54. Vent port 70 prevents inadvertent pressure build up within the regulator unit.

Referring now to FIG. 2 where the orifice assembly 12 is shown in cross section, it is seen that the orifice assembly 12 include the rotor element 32, which has the shaft 33 thereon, which shaft 33 has a flat 71 engaged by a set screw 75 (see FIG. 1) to rigidly secure the rotor element 32 to the operating knob 34.

The rotor 32 is integrally constructed from a brass disk by cutting an annular groove 80 in the rotor 32 to define a first circular plate 78 and a second circular plate 79. A central bore is drilled through the rotor 32 and the shaft 33 is inserted and permanently secured in fixed attachment by press fitting. As shown in FIG. 1, an O-ring 81 is positioned at the end of the shaft 33 for providing a compression force against O-rings 82 and 85. O-ring 82 provides a gas tight seal between the shaft 33 and the rotorsecond plate 79. O-ring 85 ensures a gas tight seal between the orifice assembly 12 and the gas outlet 22.

Figure 3:
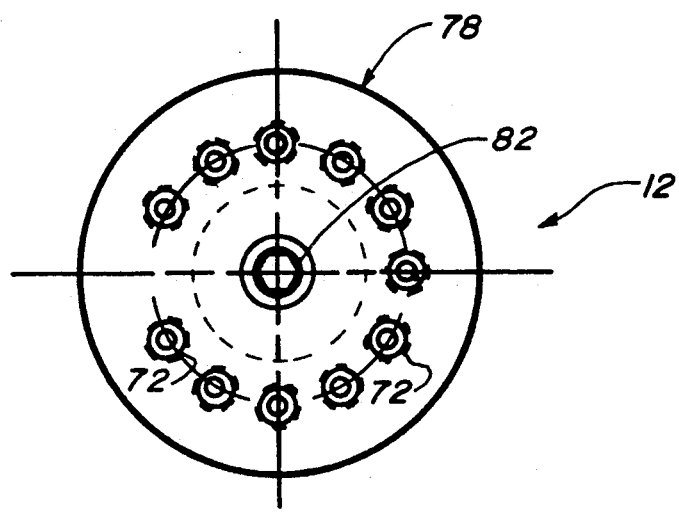
FIG. 3 is a front view of the rotor, illustrating positioning of a plurality of bores capable of accepting passage of a plug therein.

As best seen in FIG. 3, the plurality of bores 72 are symmetrically defined at a common radius from the center of the first circular plate 78 of the rotor 32. Each bore is internally threaded (threads 86) and extends completely through the first circular plate 78. As best seen in FIG. 2, the plugs 90 have external threads 92 and a slot or allen socket 93 on a first end to permit individual adjustment of the plugs within each bore 72. The plugs 90 also have a tapered end 94 for interaction with gas passageway 88 to define an opening of adjustably fix size for metering the gas flow. Typically, the threads 92 and 86 are slightly mismatched to provide an interference fit which will prevent any unwanted movement. The plugs 90 can be threadably inserted to move their respective tapered ends 94 toward gas passageways 88, axially defined in the second circular plate 79 in line with the 72 and plug 90 of the first circular plate 78.

In operation, gas flow (indicated by arrows 96) from the gas inlet 20 to the gas outlet 22 passes around the first circular plate 78, through gas conduit 84 (see FIG. 1) defined between the first circular plate 78 and the body of the gas flow meter 10, and into the annular groove 80. From the groove 80, the gas passes into one of the gas passageways 88 rotated into alignment with a gas conduit connected to the gas outlet 22. Gas flow from the groove 80 into the gas passageway 88 is inhibited by plug 90. The closer the fit between the tapered end 94 of the plug 90 and the gas passageway, the slower the rate of gas passing out through the gas outlet. As will be appreciated by those skilled in the art, this allows the rate of gas flow out of the gas outlet 22 to be simply and easily set by adjusting positioning of the plugs 90.

Although the invention has been described in detail with reference to the illustrated preferred embodiments, other variations and modifications exist within the scope and spirit of the invention as described and defined in the following claims.

What is claimed is:

1. An orifice assembly for a gas flow meter, the orifice assembly being positioned in sealed fluid connection between a gas inlet and a gas outlet respectively defined in the gas flow meter, the orifice assembly comprising
    a rotor positioned for rotatable movement in fluid connection with both the gas inlet and gas outlet, the rotor having a first circular plate separated by an annular groove from a second circular plate, the first circular plate defining a plurality of bores therethrough, and the second circular plate defining a matching number of gas passageways therethrough, each pair of bores and gas passageways being positioned along a common axis, and with the annular groove intersecting the axes of the bores and the gas passageways, the annular groove being positioned in fluid connection with the gas inlet to allow gas from the gas inlet to pass through the annular groove into the gas passageways,
    a plurality of plugs separately positioned to extend through each bore defined in the first circular plate, each plug having an end axially movable toward the gas passageways to partially block gas flow from the annular groove and gas inlet into the gas passageways, and
    means for rotating the rotor to successively bring each gas passageway into fluid communication with the gas outlet.

2. The orifice assembly of claim 1 wherein each bore is internally threaded, and wherein each plug is externally threaded to allow axially directed screw movement of each plug within its respective bore to advance or withdraw each plug from the gas passageway positioned opposite the bore.

3. The orifice assembly of claim 2 wherein internal threads of the bores are differently sized than external thread on the plugs to ensure an interference fit between each plug and each bore inhibiting relative movement therebetween.

4. An orifice assembly for a gas flow meter, the orifice assembly being positioned in sealed fluid connection between a gas inlet and gas outlet respectively defined in the gas flow meter, the orifice assembly comprising
    a rotor positioned for rotatable movement in fluid connection with both the gas inlet and gas outlet, the rotor having first and second circular plates separated from each other to define an annular groove therebetween, with the second circular plate configured to define a plurality of gas passageways therethrough, with each gas passageway positionable in fluid communication between the annular groove and the gas outlet, and with apertures of the gas passageways differentially configured to selectively inhibit gas flow from the annular groove to the gas outlet, and
    means for introducing gas from the gas inlet into the annular groove.

5. The orifice assembly of claim 4 wherein the first circular plate defines a plurality of bores therethrough, and the second circular plate defines a matching number of gas passageways therethrough 6. The orifice assembly of claim 5 wherein the introducing means further comprises means for plugging the gas passageways, the plugging means being positioned to extend through each bore and axially movable toward the gas passageways to partially block gas flow from the annular groove into the gas passageways.

7. The orifice assembly of claim 6 wherein the plugging means further comprises a plurality of plugs separately positioned to ext end through each bore defined in the first circular plate, each plug having an end axially movable toward the gas passageways to partially block gas flow from the annular groove and gas inlet into the gas passageways.

8. The orifice assembly of claim 7 wherein each bore is internally threaded, and wherein each plug is externally threaded to allow axially directed screw movement of each plug within its respective bore to advance or withdraw each plug from the gas passageway positioned opposite the bore.

9. The orifice assembly of claim 8 wherein internal threads of the bores are differently sized than external thread on the plugs to ensure an interference fit between each plug and each bore inhibiting relative movement therebetween.

10. The orifice assembly of claim 6 wherein the plugging means further comprises a plurality of plugs separately positioned to extend through each bore, each plug tapered at an end axially movable toward the gas passageways to partially block gas flow from the annular groove and gas inlet into the gas passageways.

11. The orifice assembly of claim 10 wherein each bore is internally threaded, and wherein each plug is externally threaded to allow axially directed screw movement of each plug within its respective bore to advance or withdraw each plug from the gas passageway positioned opposite the bore.

12. The orifice assembly of claim 4 further comprising means for rotating the rotor to successively bring each gas passageway into fluid communication with the gas outlet.

13. The orifice assembly of claim 12 wherein the rotating means further comprises a shaft engagable by a manually turnable knob to allow an operator to rotate the orifice to a selected position.

14. An orifice assembly for a gas flow meter, the orifice assembly being positioned in sealed fluid connection between a gas inlet and gas outlet respectively defined in the gas flow meter, the orifice assembly comprising a rotor positioned for rotatable movement in fluid connection with both the gas inlet and gas outlet, the rotor having first and second circular plates positioned in parallel, spaced apart relationship to define an annular groove therebetween, with the first circular plate defining a plurality of bores therethrough and the second circular plate defining a matching number of gas passageways therethrough, and gas flow inhibiting elements positioned adjacent to the gas passageways and configured to selectively inhibit gas flow from the annular groove into the gas outlet.

15. The orifice assembly of claim 14 further comprising means for rotating the rotor to successively bring each gas passageway into fluid communication with the gas outlet.

16. The orifice assembly of claim 15 wherein the rotating means further comprises a shaft engagable by a manually turnable knob to allow an operator to rotate the orifice to a selected position.

* * * * *